US009204441B2

(12) United States Patent
Nagaraja et al.

(10) Patent No.: US 9,204,441 B2
(45) Date of Patent: Dec. 1, 2015

(54) METHOD AND APPARATUS FOR CLASSIFYING FEMTO NODE USERS

(71) Applicant: QUALCOMM Incorporated, San Diego, CA (US)

(72) Inventors: Sumeeth Nagaraja, San Diego, CA (US); Yeliz Tokgoz, San Diego, CA (US); Mehmet Yavuz, San Diego, CA (US); Damanjit Singh, San Diego, CA (US); Andrei Dragos Radulescu, San Diego, CA (US); Chirag Sureshbhai Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 13/799,456

(22) Filed: Mar. 13, 2013

(65) Prior Publication Data

US 2013/0294264 A1 Nov. 7, 2013

Related U.S. Application Data

(60) Provisional application No. 61/641,627, filed on May 2, 2012.

(51) Int. Cl.
*G01R 31/08* (2006.01)
*H04W 72/04* (2009.01)
(Continued)

(52) U.S. Cl.
CPC .......... *H04W 72/0453* (2013.01); *H04W 16/32* (2013.01); *H04W 72/04* (2013.01); *H04W 72/048* (2013.01); *H04W 24/02* (2013.01); *H04W 84/045* (2013.01)

(58) Field of Classification Search
CPC ... H04W 84/045; H04W 88/18; H04W 48/08; H04W 24/10; H04W 36/08; H04W 72/04; H04L 5/0035; H04L 5/0055; H04L 5/0057; H04L 12/2869; H04L 12/5695; H04L 47/00; H04L 47/70; H04L 47/78; H04L 47/821; H04L 47/827
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–522, 370/521–529
See application file for complete search history.

(56) References Cited

U.S. PATENT DOCUMENTS

2008/0261563 A1* 10/2008 Drevon et al. ................ 455/411
2009/0082010 A1* 3/2009 Lee et al. ...................... 455/424
(Continued)

FOREIGN PATENT DOCUMENTS

WO 2011100653 A1 8/2011
WO 2012145713 A2 10/2012

OTHER PUBLICATIONS

International Search Report and Written Opinion—PCT/US2013/039340—ISA/EPO—Sep. 25, 2013.
(Continued)

*Primary Examiner* — Jung-Jen Liu
(74) *Attorney, Agent, or Firm* — Fariba Yadegar-Bandari

(57) ABSTRACT

A method, an apparatus, and a computer program product for wireless communication are provided in connection with classifying devices that communicate with a femto node for providing services thereto. In one example, a node is equipped to monitor and/or receive one or more parameters communicated by a device, assign a classification to the device related to a frequency of using the femto node based in part on the one or more parameters. In an aspect, the node is equipped to provide services to the device based on the classification. In another aspect, the node is equipped to provide the classification to one or more femto nodes, including the femto node, for providing services to the device.

42 Claims, 11 Drawing Sheets

1020B
1000
FEMTO NODE 1010A
1030
FEMTO NODE 1010B
1020A
MACRO CELL ACCESS NODE 1060
WIDE AREA NETWORK (E.G., INTERNET) 1040
MOBILE OPERATOR CORE NETWORK 1050

(51) Int. Cl.

| | |
|---|---|
| ***H04W 16/32*** | (2009.01) |
| *H04W 84/04* | (2009.01) |
| *H04W 24/02* | (2009.01) |

(56) References Cited

U.S. PATENT DOCUMENTS

| | | | | |
|---|---|---|---|---|
| 2009/0280853 | A1* | 11/2009 | Brisebois et al. | 455/522 |
| 2009/0285166 | A1* | 11/2009 | Huber et al. | 370/329 |
| 2010/0118844 | A1* | 5/2010 | Jiao et al. | 370/338 |
| 2010/0151857 | A1* | 6/2010 | Brisebois et al. | 455/434 |
| 2010/0151858 | A1* | 6/2010 | Brisebois et al. | 455/434 |
| 2010/0159945 | A1* | 6/2010 | Brisebois | 455/456.1 |
| 2010/0278141 | A1* | 11/2010 | Choi-Grogan et al. | 370/331 |
| 2011/0086614 | A1* | 4/2011 | Brisebois et al. | 455/411 |
| 2011/0136490 | A1* | 6/2011 | Aoyagi | 455/443 |
| 2011/0171924 | A1* | 7/2011 | Faccin et al. | 455/404.1 |
| 2011/0194534 | A1* | 8/2011 | Carmon et al. | 370/331 |
| 2011/0201351 | A1* | 8/2011 | Chen | 455/456.1 |
| 2011/0294495 | A1* | 12/2011 | Carmon et al. | 455/422.1 |
| 2012/0026865 | A1* | 2/2012 | Fan et al. | 370/225 |
| 2012/0030734 | A1* | 2/2012 | Wohlert | 726/4 |
| 2012/0040639 | A1* | 2/2012 | Brisebois et al. | 455/408 |
| 2012/0076027 | A1* | 3/2012 | Akyildiz et al. | 370/252 |
| 2012/0089719 | A1 | 4/2012 | Cha et al. | |
| 2012/0120913 | A1* | 5/2012 | Wirtanen et al. | 370/331 |
| 2012/0142392 | A1* | 6/2012 | Patel et al. | 455/522 |
| 2013/0028107 | A1* | 1/2013 | Ho et al. | 370/252 |
| 2013/0130684 | A1* | 5/2013 | Gomes et al. | 455/435.1 |
| 2013/0143553 | A1* | 6/2013 | Beattie et al. | 455/434 |
| 2013/0188604 | A1* | 7/2013 | Chin et al. | 370/331 |
| 2013/0189977 | A1* | 7/2013 | Brisebois et al. | 455/434 |
| 2013/0231118 | A1* | 9/2013 | Whinnett et al. | 455/444 |
| 2013/0344861 | A1* | 12/2013 | Brisebois et al. | 455/418 |
| 2014/0080499 | A1* | 3/2014 | Brisebois et al. | 455/452.1 |
| 2014/0094149 | A1* | 4/2014 | Claussen et al. | 455/411 |
| 2014/0128090 | A1* | 5/2014 | Lim | 455/452.2 |

OTHER PUBLICATIONS

Li, et al., "User Classifying-based Hybrid Spectrum Allocation in Two-tier OFDMA Femtocell Networks", Vehicular Technology Conference, Sep. 2012, pp. 1-5.

3GPP TS 25.413 v9.1.0, "UTRAN lu interface Radio Access Network Application Part (RANAP) signalling (Release 9)," Dec. 18, 2009.

3GPP TS 36.413 V10.3.0, "Evolved Universal Terrestrial Radio Access Network (E-UTRAN); 51 Application Protocol (S1AP) (Release 10)," Sep. 27, 2011.

* cited by examiner

METHOD AND APPARATUS FOR CLASSIFYING FEMTO NODE USERS

CLAIM OF PRIORITY UNDER 35 U.S.C. §119

The present Application for Patent claims priority to Provisional Application No. 61/641,627 entitled "METHOD AND APPARATUS FOR CLASSIFYING FEMTO NODE USERS" filed May 2, 2012, and assigned to the assignee hereof and hereby expressly incorporated by reference herein.

BACKGROUND

The disclosed aspects relate generally to communications between and/or within devices and specifically to methods and systems for classifying femto node users.

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

To supplement conventional base stations, additional low power base stations can be deployed to provide more robust wireless coverage to mobile devices. For example, low power base stations (e.g., which can be commonly referred to as Home NodeBs or Home eNBs, collectively referred to as H(e)NBs, femto nodes, femtocell nodes, pico nodes, micro nodes, etc.) can be deployed for incremental capacity growth, richer user experience, in-building or other specific geographic coverage, and/or the like. In some configurations, such low power base stations are connected to the Internet via broadband connection (e.g., digital subscriber line (DSL) router, cable or other modem, etc.), which can provide the backhaul link to the mobile operator's network. In this regard, low power base stations are often deployed in homes, offices, etc. without consideration of a current network environment.

Thus, improved apparatus and methods for classifying devices that communicate with a femto node and for providing services to the devices may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with classifying devices that communicate with a femto node for providing services thereto. In one example, a node is equipped to monitor and/or receive one or more parameters communicated by a device, assign a classification to the device related to a frequency of using the femto node based in part on the one or more parameters. In an aspect, the node is equipped to provide services to the device based on the classification. In another aspect, the node is equipped to provide the classification to one or more femto nodes, including the femto node, for providing services to the device.

According to related aspects, a method for classifying devices that communicate with a femto node for providing services thereto is provided. The method can include monitoring one or more parameters communicated by a device to a femto node. Further, the method can include assigning a classification to the device related to a frequency of using the femto node based in part on the one or more parameters. Moreover, the method may include providing services to the device based on the classification.

Another aspect relates to a communications apparatus enabled to classify devices that communicate with a femto node for providing services thereto. The communications apparatus can include means for monitoring one or more parameters communicated by a device to a femto node. Further, the communications apparatus can include means for assigning a classification to the device related to a frequency of using the femto node based in part on the one or more parameters. Moreover, the communications apparatus can include means for providing services to the device based on the classification.

Another aspect relates to a communications apparatus. The apparatus can include a processing system configured to monitor one or more parameters communicated by a device to a femto node. Further, the processing system may be configured to assign a classification to the device related to a frequency of using the femto node based in part on the one or more parameters. Moreover, the processing system may further be configured to provide services to the device based on the classification.

Still another aspect relates to a computer program product, which can have a computer-readable medium including code for monitoring one or more parameters communicated by a device to a femto node. Further, the computer-readable medium may include code for assigning a classification to the device related to a frequency of using the femto node based in part on the one or more parameters. Moreover, the computer-readable medium can include code for providing services to the device based on the classification.

According to related aspects, a method for classifying devices that communicate with a femto node for providing services thereto is provided. The method can include receiving one or more parameters communicated by a device to a femto node. Further, the method can include assigning a classification to the device related to a frequency of using the femto node based in part on the one or more parameters. Moreover, the method may include providing the classification to one or more femto nodes, including the femto node, for providing services to the device.

Another aspect relates to a communications apparatus enabled to classify devices that communicate with a femto node for providing services thereto. The communications apparatus can include means for receiving one or more parameters communicated by a device to a femto node. Further, the communications apparatus can include means for assigning a classification to the device related to a frequency of using the femto node based in part on the one or more parameters. Moreover, the communications apparatus can include means for providing the classification to one or more femto nodes, including the femto node, for providing services to the device.

Another aspect relates to a communications apparatus. The apparatus can include a processing system configured to receive one or more parameters communicated by a device to a femto node. Further, the processing system may be configured to assign a classification to the device related to a frequency of using the femto node based in part on the one or more parameters. Moreover, the processing system may further be configured to providing the classification to one or more femto nodes, including the femto node, for providing services to the device.

Still another aspect relates to a computer program product, which can have a computer-readable medium including code for receiving one or more parameters communicated by a device to a femto node. Further, the computer-readable medium may include code for assigning a classification to the device related to a frequency of using the femto node based in part on the one or more parameters. Moreover, the computer-readable medium can include code for providing the classification to one or more femto nodes, including the femto node, for providing services to the device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
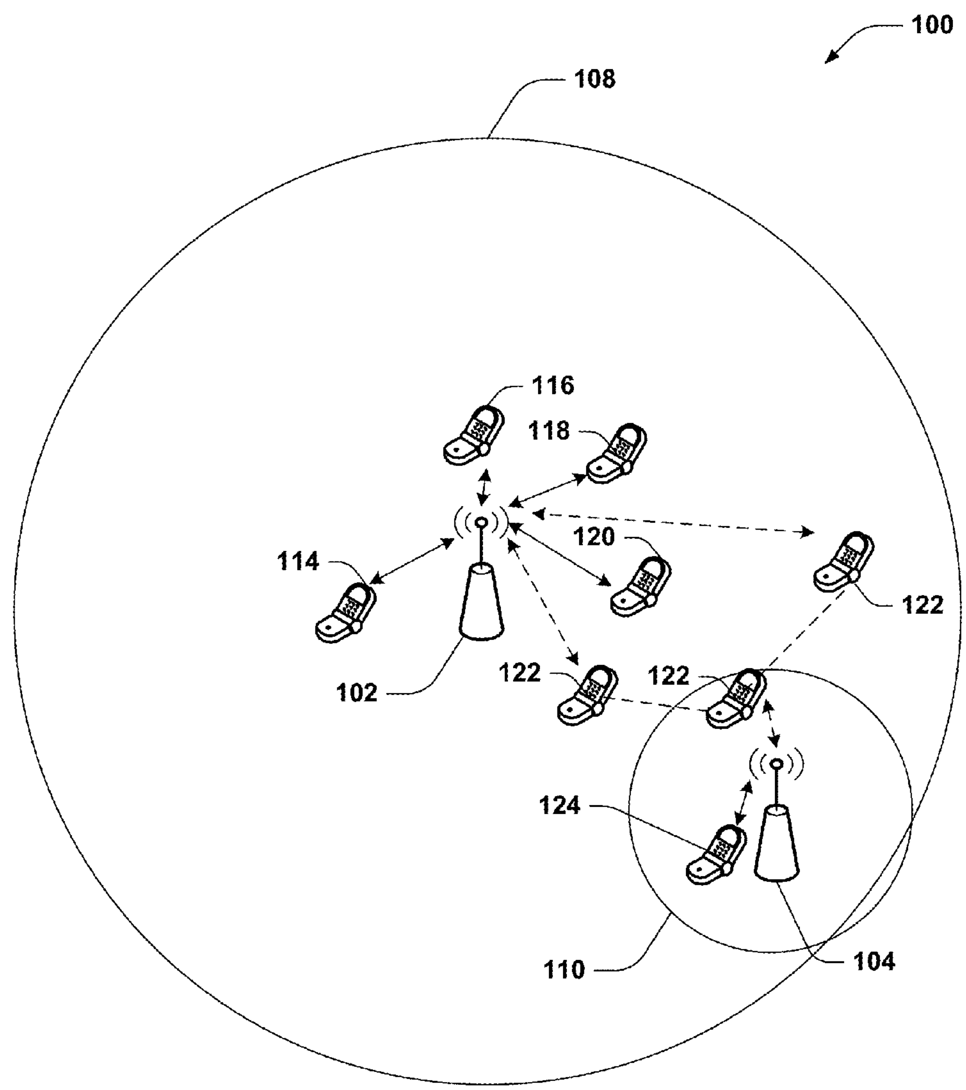
FIG. 1 is a block diagram of an example system that facilitates communicating with multiple devices in a wireless network.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, low power base stations, such as femto nodes, can classify devices for providing services thereto. For example, the low power base stations can classify devices as frequent users, non-frequent users, less frequent users, etc. and can perform one or more actions based on the classification. In an example, the one or more actions can include allocating resources to the devices (e.g., transmission power, frequency/time communication resources, etc.), specifying available services to the devices, targeting information to the devices based on the classification (e.g., advertisements), and/or the like. The low power base stations can classify the devices based on one or more parameters related to monitoring idle mode behavior of the devices, active mode behavior of the devices, handover of the devices, and/or the like.

A low power base station, as referenced herein, can include a femto node, a pico node, micro node, home Node B or home evolved Node B (H(e)NB), relay, and/or other low power base stations, and can be referred to herein using one of these terms, though use of these terms is intended to generally encompass low power base stations. For example, a low power base station transmits at a relatively low power as compared to a macro base station associated with a wireless wide area network (WWAN). As such, the coverage area of the low power base station can be substantially smaller than the coverage area of a macro base station.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal or device may be a cellular telephone, a satellite phone, a cordless telephone, a Session Initiation Protocol (SIP) phone, a wireless local loop (WLL) station, a personal digital assistant (PDA), a handheld device having wireless connection capability, a tablet, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), home Node B (HNB) or home evolved Node B (HeNB), collectively referred to as H(e)NB, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA, WiFi carrier sense multiple access (CSMA), and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, an example wireless communication system 100 is illustrated that facilitates providing femto nodes within or near a coverage area of another node. System 100 comprises a macro node 102; though shown and described as a macro node, it is to be appreciated that the functions described herein can be similarly applied where macro node 102 is a femto node, pico node, or other low power base station node, in one example. System 100 also includes a femto node 104, which can be substantially any type of low power base station or at least a portion thereof. The nodes 102 and 104 provide respective coverage areas 108 and 110. System 100 also includes a plurality of devices 114, 116, 118, 120, 122, and 124 that communicate with the nodes 102 or 104 to receive wireless network access.

As described, the femto node 104 can communicate with the wireless network (not shown) over a broadband connection. In addition, femto node 104 can communicate with macro node 102 over a backhaul connection. For example, the backhaul connection can be a connection managed through the core wireless network accessible over the broadband connection at the femto node 104 and/or over a connection through a radio network controller (RNC) that communicates with macro node 102. For example, upon initialization, the femto node 104 can also communicate with another femto node (not shown) to form a grouping (e.g., an ad-hoc network). This allows the femto nodes 104 and/or 106 to communicate to determine parameters related to serving the various devices connected thereto (e.g., resource allocations, interference management, and/or the like), in one example. Moreover, femto node 104 can automatically configure itself to operate in the wireless network (e.g., set transmit power, network identifiers, pilot signal resources, and/or the like based on similar information received over a backhaul connection, over-the-air, or otherwise sensed from surrounding nodes). In this example, the femto node 104 can behave as plug-and-play devices requiring little user interaction to be provisioned on the wireless network.

In one example, femto node 104 can operate in an open or hybrid access mode—along with other femto nodes (not shown) in the macro node 102 coverage area 108—to offload devices from macro node 102. In this example, allowing the femto nodes to specify communication parameters to define a coverage area based on measured capabilities of other nodes provides a self-configuration ability from which the above scenario can benefit. In this regard, devices offloaded from macro node 102 can be directed to femto nodes that provide the best or at least reasonable communication capabilities for the device. In some examples, however, it is to be appreciated that femto nodes operating in a hybrid access mode can prefer member devices to non-member devices. In either case, the additional aspects described herein allow for further preference to be given to devices that frequently use the femto node 104.

In accordance with aspects described herein, femto node 104 can classify devices communicating therewith to provide different services or service levels thereto. For example, device 124 can frequently communicate with femto node 104. In an example, device 124 can be within coverage area 110 of femto node 104 for an extended period of time, which may result from the femto node 104 being owned by a user related to device 124. In any case, femto node 104 can classify device 124 as a frequency user. Conversely, device 122 can communicate mostly with macro node 102, but can move within and outside of coverage area 110 one or more times throughout a period of time (e.g., and can be at least temporarily offloaded to the femto node 104 at some point). Femto node 104 can classify this device 122 as a less frequent or non-frequent user. Based on the classification, femto node 104 can provide differing services or levels of service to the devices 122 and 124 (e.g., allow device 124 to utilize a higher transmit power, grant more resources to device 124, present targeted advertisements to device 124—or device 122 to, for instance, collect revenue in exchange for providing service to device 122—and/or the like). Femto node 104, for example, can classify the devices 122 and 124 based on monitoring idle mode communications, active mode communications, or handover information related to the devices 122 and 124.

Figure 2:
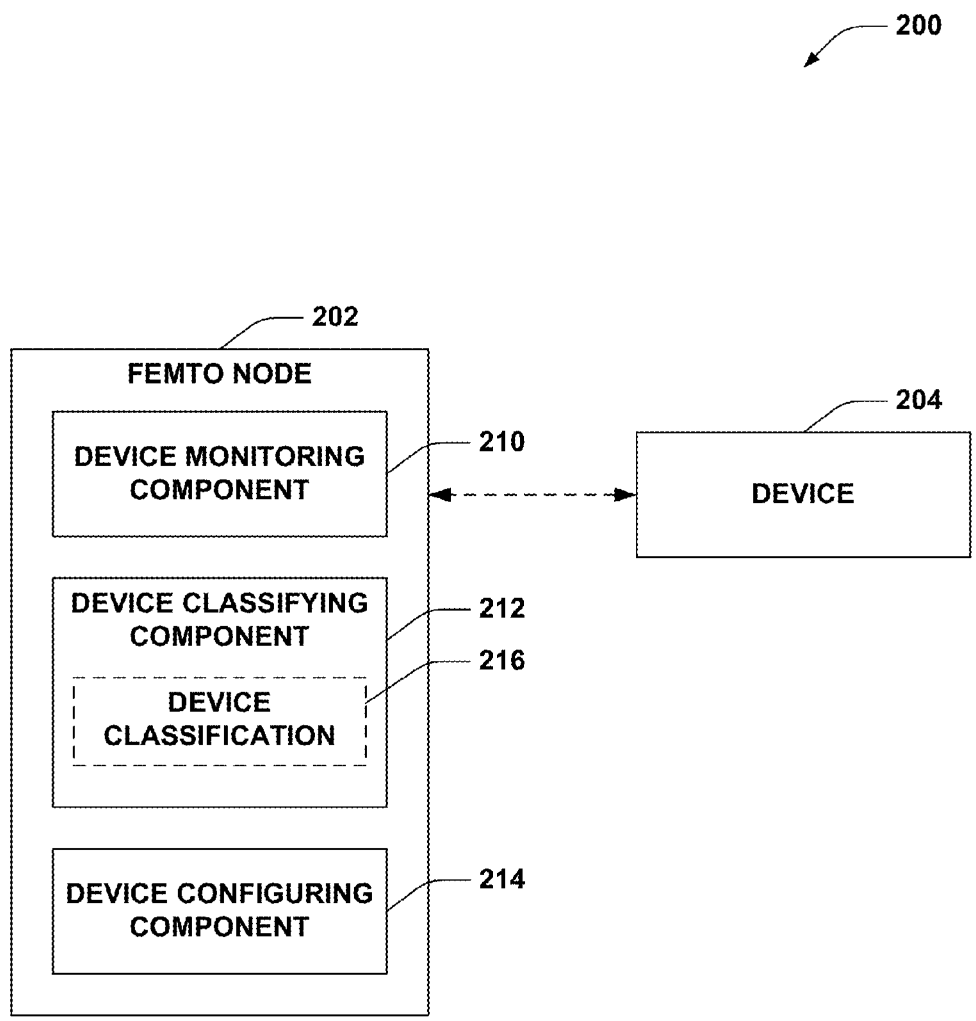
FIG. 2 is a block diagram of an example system that facilitates classifying devices for providing varying services or levels of service thereto.

FIG. 2 illustrates an example system 200 for classifying devices to provide services thereto. System 200 comprises a femto node 202 that can provide wireless network access to one or more devices, such a device 204, which can be similar to device 122 or 124. Thus, for example, femto node 202 can be similar to femto node 104. In this example, femto node 202 can communicate with other femto nodes or macro nodes over a backhaul or optionally through a management server or gateway (e.g., H(e)NB management server (HMS) or H(e) NB gateway (HGW)) to manage parameters related to providing network access to the devices.

Femto node 202 can include a device monitoring component 210 for monitoring one or more parameters related to a device, a device classifying component 212 for assigning a classification to the device based on the one or more parameters, and a device configuring component 214 for configuring one or more services or service levels provided to the device based on the classification.

According to an example, device 204 can communicate with femto node 202 to receive wireless network access. Device classifying component 212 can assign a classification 216 to the device as a frequent, less frequent, or non-frequent user based on one or more parameters of the device 204 observed by device monitoring component 210. This can include comparing the one or more parameters to one or more thresholds, parameters of other devices communicating with femto node 202, and/or the like. Additional levels of classification are possible as well based on comparing monitored parameters to one or more thresholds. Device classifying component 212 can maintain a list of determined device classifications 216. Based on the determined device classification, device configuring component 214 can determine a configuration of one or more services for providing to the device 204 (e.g., an allowed transmit power, an allowed time/frequency resource assignment, an allowed set of services, whether to provide advertisements to the device 204, a set of advertisements for providing to the device 204, and/or the like).

For example, device monitoring component 210 can monitor various aspects of the device 204, such as idle mode signaling, active mode signaling, handover signaling, and/or the like. In an example, device monitoring component 210 can monitor location area updates (LAU), routing area updates (RAU), or similar paging area updates from the device 204. This can be based on requesting the updates upon device 204 registration. Device classifying component 212 can classify device 204 based on LAU/RAU received from device 204. For example, if device 204 reports LAU/RAU a threshold number of times over a specified time period (e.g., in relation to a requested or expected number of LAU, RAU, etc.), device classifying component 212 can classify device 204 as a frequent user of femto node 202. In another example, device classifying component 212 can determine classification based on a time between sequential LAU/RAU from the device 204, where a time between that achieves a threshold can indicate the device 204 is not as frequent of a user.

In other examples, device monitoring component 210 can page devices via an identifier related thereto (e.g., an international mobile subscriber identity (IMSI), temporary IMSI (TIMSI), etc.) to determine whether the devices, such as device 204, respond. Device classifying component 212 can classify device 204 based in part on whether a response is received to the page. In one example, this can include determining whether a threshold number of responses are received for a number of pages, etc. Moreover, in an example, device monitoring component 210 can determine when device 204 registers with femto node 202 and when device 204 performs handout (e.g., in cell paging channel (CELL_PCH), which can include detecting a CELL_UPDATE message from device 204, or other reselection mode), and device classifying component 212 can use a difference in time between the registration and handout, the number of handovers over a given time period, etc., to classify device 204 frequency of use. In another example, device monitoring component 210 can change a LAC, RAC, etc. and page device 204 indicating the change (e.g., in system information block (SIB), master information block (MIB), etc.). Thus, device monitoring component 210 can determine whether the device 204 responds with a registration request. Device classifying component 212 can use device 204 responses, similarly as described above, to determine a classification for the device 204 as a frequent user, a less frequent user, a non-frequent user, etc.

In another example, device monitoring component 210 can monitor active mode communications of device 204. In an example, device monitoring component 210 can send measurement control messages (MCM) to device 204 to determine whether the device 204 complicity returns measurement reports to femto node 202 in accordance with the MCM. For example, the MCM can specify a time interval for sending the measurement reports. Whether the device 204 responds with one or more measurement reports, a frequency of responses over time, an amount of time between sequential reports, and/or the like can be used by device classifying component 212 to determine a classification for device 204. For example, the more device 204 provides measurement reports to femto node 202 at opportunities defined in the MCM, the device classifying component 212 can classify device 204 as a more frequent user.

In other examples, device monitoring component 210 can monitor frequency of call initiation and termination of device 204 on the femto node 202, duration of calls of device 204 at femto node 202, a distribution of frequency of inter-call initiation times by device 204 at femto node 202 (e.g. a number of calls initiated by device 204 on femto node 202 over a period of time), device 204 arrival at and/or departure from femto node 202 through connected or active mode handovers (e.g., and/or a time difference between arrival and/or departure to compute a time on the femto node 202 as described), applications/services used or accessed by device 204, and/or the like. Device classifying component 212 can determine a classification for device 204 based on measurements of the foregoing metrics. For example, the more frequent call initiation, the longer duration of calls, the higher frequency of inter-call initiation time, the less handovers or more time spent on the femto node, etc., the more frequent of a user that device classifying component 212 can classify device 204.

In another example, device monitoring component 210 can track a pathloss to device 204 over time and can store the pathloss measurements with the device 204 IMSI. In this example, device classifying component 212 can classify the device 204 based on the pathloss measurements (e.g., the more frequent the pathloss measurements achieve a threshold over time, the more frequent of a user the device 204 is classified). In another example, device monitoring component 210 can rank the IMSIs according to pathloss measurements and can classify device 204 based on ranking against other devices.

In yet another example, device monitoring component 210 can obtain handover information related to the device 204, such as when device is handed over to/from femto node 202, UE History Information in UMTS/LTE, etc. For example, device monitoring component 210 can determine when device 204 is handed over from femto node 202 to another node as compared to a time of registration or handover of the device 204 to femto node 202 to determine a duration on femto node 202. Device classifying component 212 can classify device 204 based on these parameters. In another example, device monitoring component 210 can obtain handover information elements (IE) based on receiving handover of device 204. Such IEs can include a list of a last n nodes to which device 204 connected along with a connected time duration, where n is a positive integer (e.g., or a list of nodes over a period of time, etc.). Device classifying component 212 can classify the device 204 based on such information. For example, where device classifying component 212 determines device 204 was connected to femto node 202 for over a threshold period of time, device classifying component 212 can classify device 204 as a frequent user. Where device classifying component 212 determines device 204 was connected to nodes near to femto node 202 (e.g., in a respective macro node coverage area) for a threshold period of time and connected to femto node 202 for less than a threshold period of time, and thus is a frequent user in the neighborhood, device classifying component 212 can classify device 204 as a less frequent user (e.g., but not a non-frequent user), etc. to provide varying services or levels of service for different classifications.

Moreover, though functions are shown and described at a femto node 202, it is to be appreciated that at least some functions can be similarly performed, and related components can be employed, by a centralized entity communicating with a plurality of femto nodes. In one example, the centralized entity can receive monitored information from device monitoring component 210 at the plurality of femto nodes, and the centralized entity can include a device classifying component 212 that accordingly classifies devices and/or provides device classifications 216 to the plurality of femto nodes. In another example, the centralized entity can also monitor devices (and thus can include device monitoring component 210).

Figure 3:
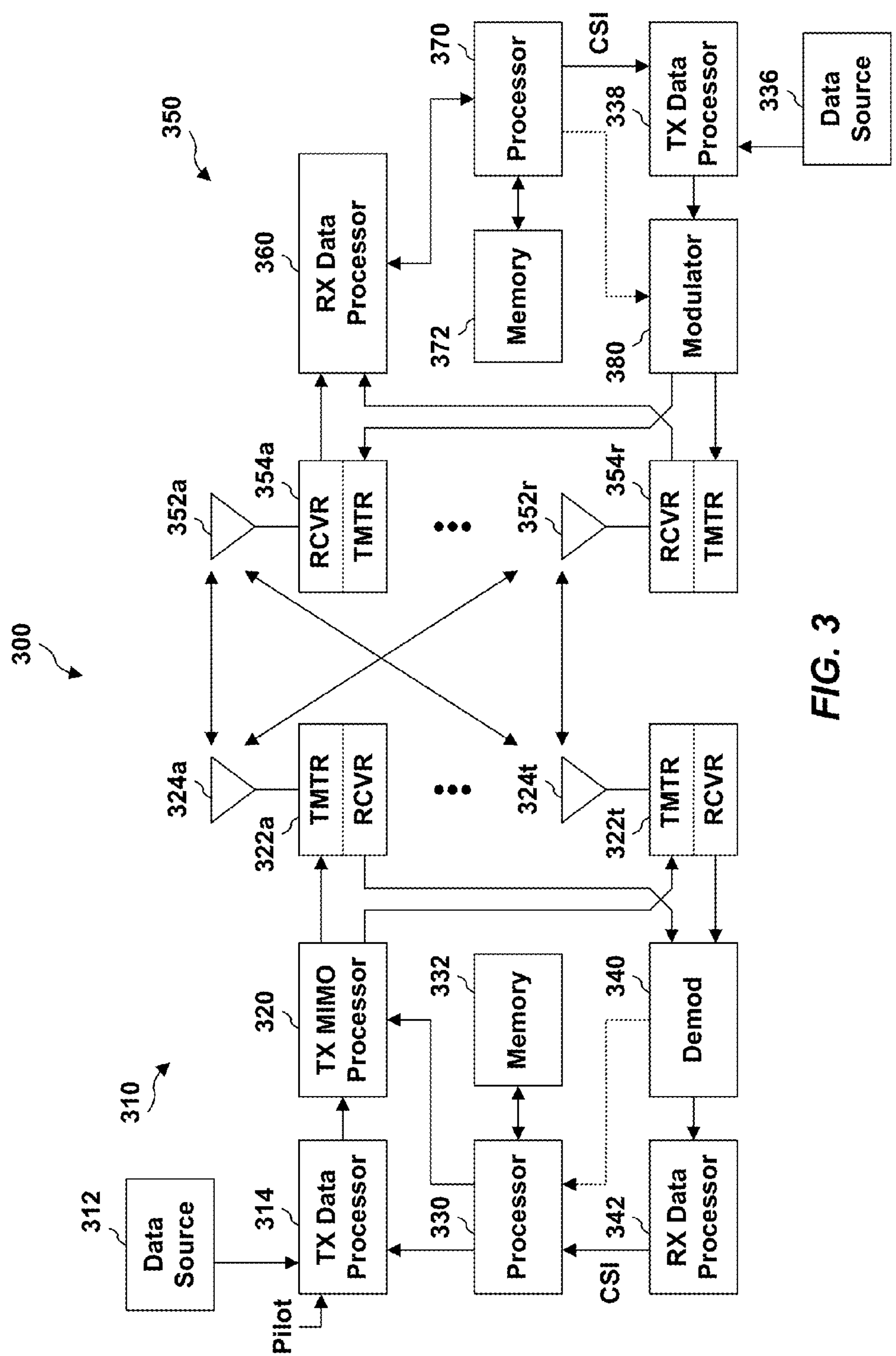
FIG. 3 is a block diagram of an example wireless communication system in accordance with various aspects set forth herein.

FIG. 3 shows an example wireless communication system 300. The wireless communication system 300 depicts one base station 310, which can include a femto node, and one mobile device 350 for sake of brevity. However, it is to be appreciated that system 300 can include more than one base station and/or more than one mobile device, wherein additional base stations and/or mobile devices can be substantially similar or different from example base station 310 and mobile device 350 described below. In addition, it is to be appreciated that base station 310 and/or mobile device 350 can employ the systems (FIGS. 1, 2, 6, and 8) and/or methods (FIG. 5) described herein to facilitate wireless communication there between. For example, components or functions of the systems and/or methods described herein can be part of a memory 332 and/or 372 or processors 330 and/or 370 described below, and/or can be executed by processors 330 and/or 370 to perform the disclosed functions.

At base station 310, traffic data for a number of data streams is provided from a data source 312 to a transmit (TX) data processor 314. According to an example, each data stream can be transmitted over a respective antenna. TX data processor 314 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 350 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 330.

The modulation symbols for the data streams can be provided to a TX MIMO processor 320, which can further process the modulation symbols (e.g., for OFDM). TX MIMO processor 320 then provides $N_T$ modulation symbol streams to $N_T$ transmitters (TMTR) 322_a_ through 322_t_. In various embodiments, TX MIMO processor 320 applies beamforming weights to the symbols of the data streams and to the antenna from which the symbol is being transmitted.

Each transmitter 322 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 322_a_ through 322_t_ are transmitted from $N_T$ antennas 324_a_ through 324_t_, respectively.

At mobile device 350, the transmitted modulated signals are received by $N_R$ antennas 352_a_ through 352_r_ and the received signal from each antenna 352 is provided to a respective receiver (RCVR) 354_a_ through 354_r_. Each receiver 354 conditions (e.g., filters, amplifies, and downconverts) a respective signal, digitizes the conditioned signal to provide samples, and further processes the samples to provide a corresponding "received" symbol stream.

An RX data processor 360 can receive and process the $N_R$ received symbol streams from $N_R$ receivers 354 based on a particular receiver processing technique to provide $N_T$ "detected" symbol streams. RX data processor 360 can demodulate, deinterleave, and decode each detected symbol stream to recover the traffic data for the data stream. The processing by RX data processor 360 is complementary to that performed by TX MIMO processor 320 and TX data processor 314 at base station 310.

The reverse link message can comprise various types of information regarding the communication link and/or the received data stream. The reverse link message can be processed by a TX data processor 338, which also receives traffic data for a number of data streams from a data source 336, modulated by a modulator 380, conditioned by transmitters 354_a_ through 354_r_, and transmitted back to base station 310.

At base station 310, the modulated signals from mobile device 350 are received by antennas 324, conditioned by receivers 322, demodulated by a demodulator 340, and processed by a RX data processor 342 to extract the reverse link message transmitted by mobile device 350. Further, processor 330 can process the extracted message to determine which precoding matrix to use for determining the beamforming weights.

Processors 330 and 370 can direct (e.g., control, coordinate, manage, etc.) operation at base station 310 and mobile device 350, respectively. Respective processors 330 and 370 can be associated with memory 332 and 372 that store program codes and data. Processors 330 and 370 can also perform functionalities described herein to support classifying devices and providing varying levels of service thereto.

Figure 4:
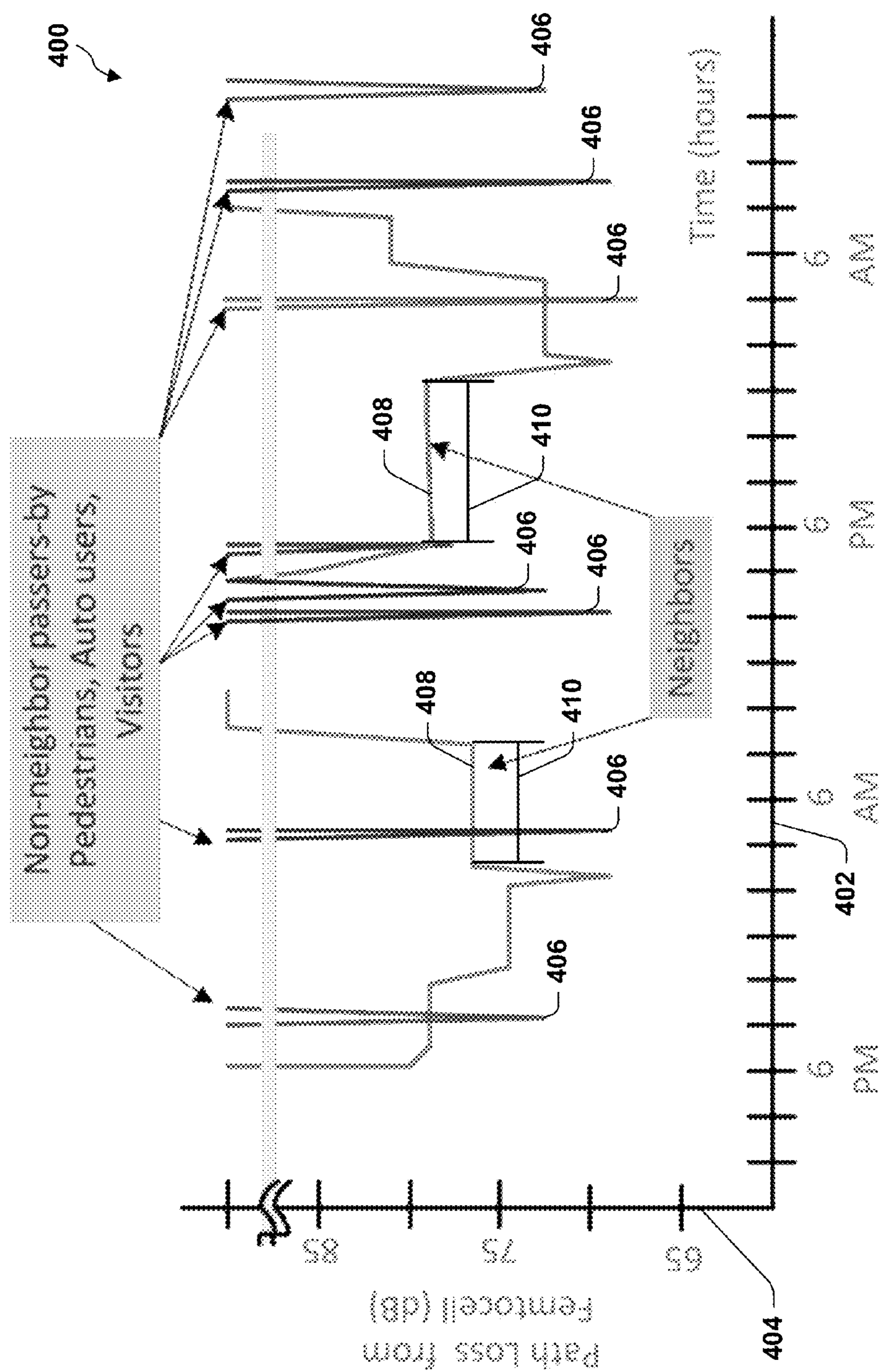
FIG. 4 is an example graphical representation of a system that facilitates classifying devices for providing varying services or levels of service thereto

Referring to FIG. 4, a graphical representation 400 of an example system for classifying devices for providing service thereto is illustrated.

The graphical representation 400 depicts pathloss 404 measurements over time 402 for an example system with a femto node and multiple devices. In such an example system, a femto node may analyze the pathloss 404 measurements to assist in distinguishing between neighbor devices 408 and passer-by devices 406. In an aspect, femto node may monitor the pathloss 404 measurements for patterns/trends over time 402. For example, a passer-by device 406 may have pathloss 404 measurements that generate a sharp peak/trough pattern that lasts a short time duration. In another example, a neighbor device 408 may have pathloss 404 measurements that have a lesser gradient and/or are substantially constant for a duration 410. As such, a node (e.g., a femto cell) may distinguish between neighbor devices 408 and passer-by device 406 based on analysis of their respective pathloss 404 characteristics over time 402.

Figure 5:
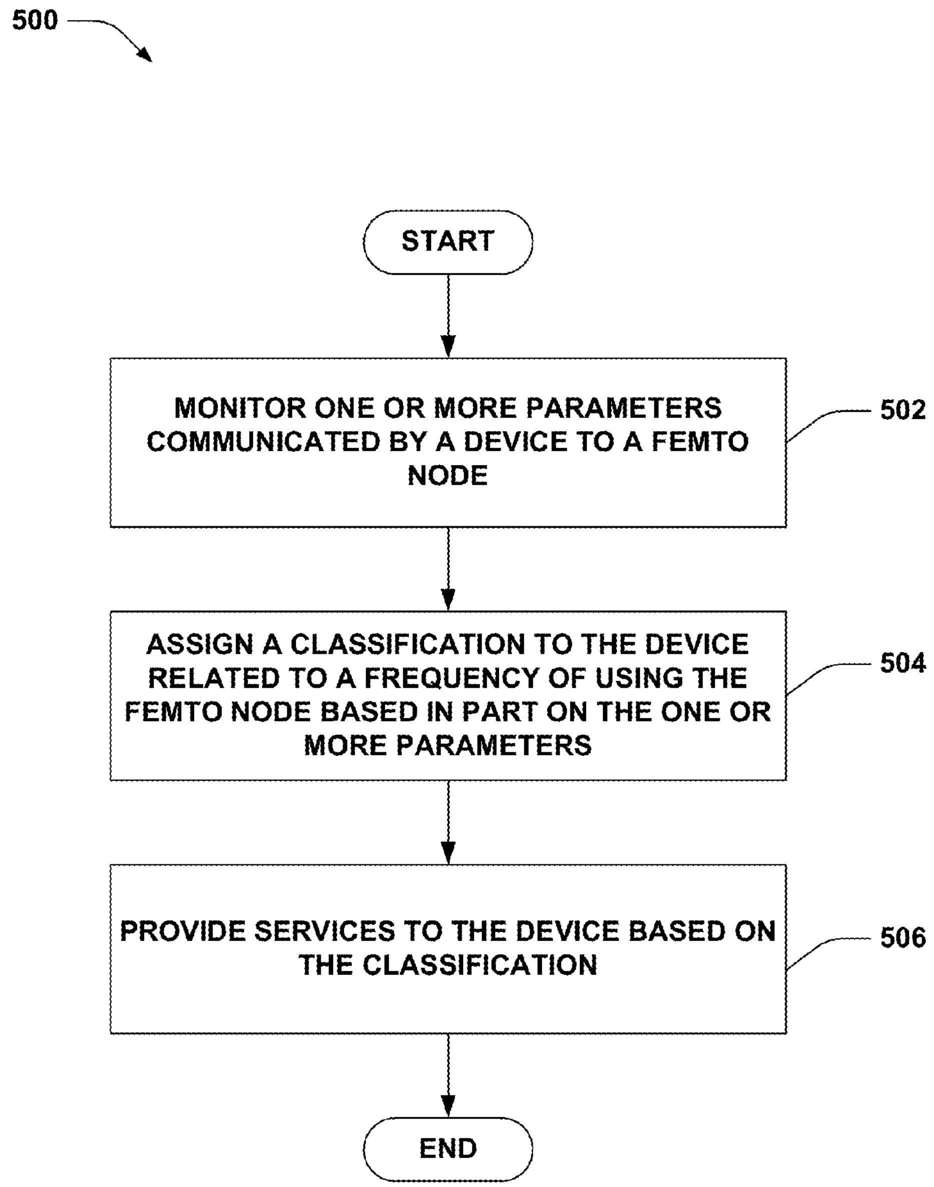
FIG. 5 is a flow chart of an aspect of an example methodology for classifying devices and providing service thereto based on the classification.

Referring to FIG. 5, an example methodology relating to classifying devices for providing services thereto is illustrated. While, for purposes of simplicity of explanation, methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Turning to FIG. 5, an example methodology 500 is displayed that facilitates classifying devices for providing classification-based services.

At 502, one or more parameters communicated by a device to a femto node can be monitored. As described, the one or more parameters can relate to idle-mode or active-mode communications of the device, handover of the device, and/or the like. For example, the parameters can relate to LAU/RAU reported by a device (e.g., based on a request from the femto node), responses to transmitted paging messages, handout messages over a paging channel, responses to changing LAC/RAC of the femto node, measurement reports received based on a MCM, call related parameters, ranking of IMSIs according to pathloss, applications/services used by the device, UE handover IEs, and/or the like, as described.

At 504, a classification can be assigned to the device related to a frequency of using the femto node based in part on the one or more parameters. For example, the classification can relate to a frequent user, non-frequent user, less frequent user, or other varying levels of frequency. Thus, the classification can be assigned based on comparing the one or more parameters to a threshold, to similar parameters of other devices communicating with the femto node, and/or the like, as described. In one example, this can be performed by a centralized entity as well based on receiving parameters that are monitored at 502 from one or more femto nodes.

At 506, based on the classification, services can be provided to the device. The services can relate to receiving transmit power or resource allocation, receiving indications of available services, receiving certain advertisements, and/or the like. Thus, where the device is classified as a frequent user, the device can receive additional transmit power, resource allocation, services, etc. than a device classified as a less frequent user. In another example, where step 504 is performed at a centralized entity, the classification can be provided to a femto node for providing the services to the device based on the classification.

It will be appreciated that, in accordance with one or more aspects described herein, inferences can be made regarding determining a classification based on monitored parameters, comparing the monitored parameters to one or more thresholds or parameters of another device, determining services to provide to different classification levels, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 6:
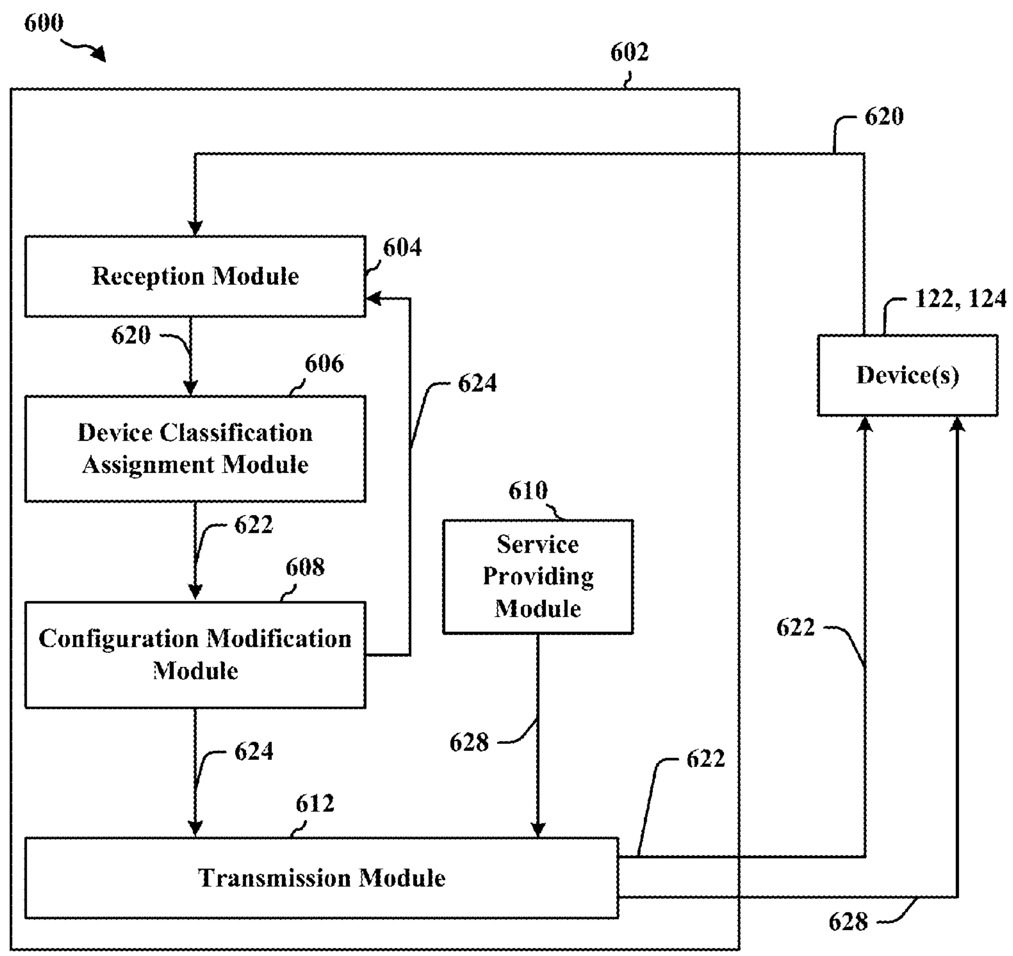
FIG. 6 is a conceptual data flow diagram illustrating the data flow between different modules/means/components in an exemplary apparatus.

FIG. 6 is a conceptual data flow diagram 600 illustrating the data flow between different modules/means/components in an exemplary apparatus 602. The apparatus may be a node (e.g., femto node, macro node, etc.). The apparatus includes a reception module 604, a device classification assignment module 606, a configuration modification module 608, a service providing module 610, and a transmission module 612.

In an operational aspect, reception module 604 may receive one or more parameters 620 communicated by various devices 122, 124. In an aspect, the reception may monitor the various devices 122, 124 to receive the one or more parameters 620. In another aspect, the apparatus 602 may receive the one or more parameters 620 from another device (e.g., femto node, macro node, etc.) that has monitored the various devices 122, 124. In an aspect, the parameters may relate to idle-mode communications, active-mode communications, or handover of the device. In another aspect, the parameters may include frequency of call initiation or termination at the femto node, a duration of one or more calls at the femto node, a frequency of inter-call initiation times at the femto node, etc. In another aspect, the parameters 620 may be related to calls of the device at the femto node. In another aspect, the parameters 620 may be related handover of the device to the femto node relative to handover of the device from the femto node. In another aspect, the parameters 620 may be related to applications or services of the femto node used by the device. In another aspect, the parameters 620 may be related to handover information elements regarding the device received from a node from which the device is handed over to the femto node. Further, the reception module 604 may monitor location area update, routing area update messages, etc., from the device 122, 124. In another aspect, apparatus 602 may transmit, via transmission module 612, paging messages 622 to the device 122, 124, to prompt the device 122, 124 to respond to the paging messages. The paging responses are monitored by reception module 604. In another aspect, apparatus 602 may transmit, via transmission module 612, measurement control messages 624 to the device 122, 124, to prompt the device 122, 124 to send a measurement report. At least the number of measurement control messages received may be monitored by reception module 604. In an aspect, reception module 604 may monitor one or more handovers of the device to another node. In another aspect, reception module 604 may perform one or more pathloss measurements from the femto node to the device 122, 124, and may monitor the parameters over time.

In an aspect, device classification assignment module 606 may receive the monitored parameters 620 and may classify the devices 122, 124 based on the parameters 620. In an aspect, device classification assignment module 606 may classify the devices 122, 124 based at least in part on one or more handovers relative to one or more registration requests from the device 122, 124. In another aspect, device classification assignment module 606 may analyze the devices 122, 124 by ranking them based on pathloss measurements and subsequently classify the devices 122, 124 based at least in part the ranking of the device among the plurality of devices. In another aspect, the device classification assignment module 606 may classify the devices 122, 124 based at least in part on comparing the one or more parameters to one or more thresholds. In another aspect, the device classification assignment module 606 may classify the devices 122, 124 based at least in part on comparing the one or more parameters to similar parameters monitored of other devices communicating with the femto node.

In an aspect, configuration modification module 608 may receive the device classification information 622 and modify a location area code or routing area code of the femto node in response to the classification information 622. In such an aspect, the apparatus may use reception module 604 to monitor devices parameters based on the modified configurations 624.

Service providing module 610 may provide one or more services 628 to the various device 122, 124 via transmission module 612. In an aspect, service providing module 610 may determine a transmission power or time/frequency resource allocation for the device based on the classification information 622 and/or any configuration modification information 624. In another aspect, service providing module 610 may determine a set of services to provide to the device based on the classification information 622 and/or any configuration modification information 624. In another aspect, service providing module 610 may determine one or more advertisements to provide to the device based on the classification information 622 and/or any configuration modification information 624.

The apparatus may include additional modules that perform each of the steps of the algorithm in the aforementioned flow chart of FIG. 5. As such, each block in the aforementioned flow chart of FIG. 5 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 7:
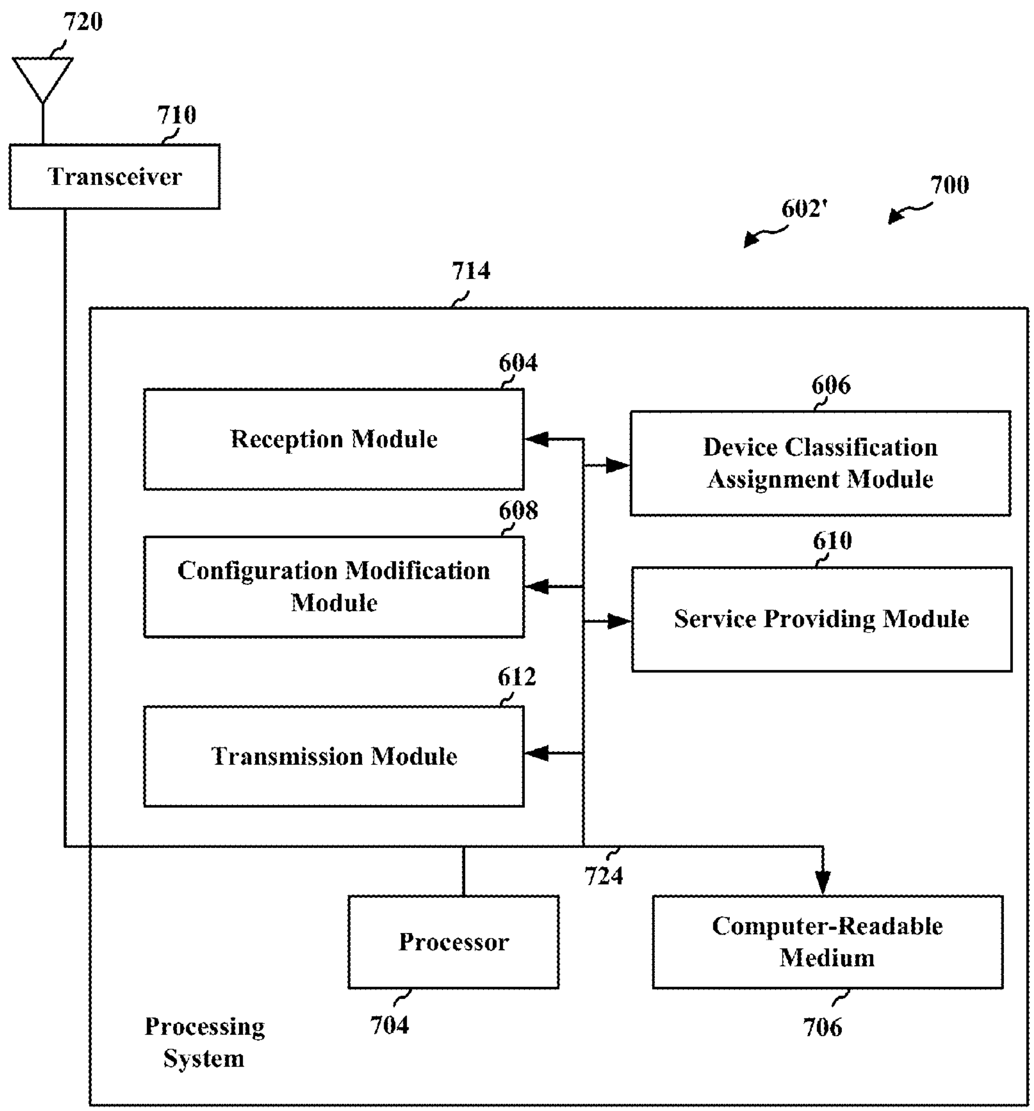
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware modules, represented by the processor 704, the modules 604, 606, 608, 610, 612, and the computer-readable medium 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The processing system 714 includes a processor 704 coupled to a computer-readable medium 706. The processor 704 is responsible for general processing, including the execution of software stored on the computer-readable medium 706. The software, when executed by the processor 704, causes the processing system 714 to perform the various functions described supra for any particular apparatus. The computer-readable medium 706 may also be used for storing data that is manipulated by the processor 704 when executing software. The processing system further includes at least one of the modules 604, 606, 608, 610, and 612. The modules may be software modules running in the processor 704, resident/stored in the computer-readable medium 706, one or more hardware modules coupled to the processor 704, or some combination thereof. The processing system 714 may be a component of the base station 310 and may include the memory 332 and/or at least one of the TX data processor 314, the RX data processor 342, and the controller/processor 330.

In one configuration, the apparatus 602/602' for wireless communication includes means for monitoring one or more parameters communicated by a device to a femto node, means for assigning a classification to the device related to a frequency of using the femto node based in part on the one or more parameters, and means for providing services to the device based on the classification. In an aspect, the apparatus 602/602' means for monitoring may be further configured monitor location area update or routing area update messages from the device. In an aspect, the apparatus 602/602' means for monitoring may be further configured monitor responses to paging messages. In an aspect, the apparatus 602/602' means for monitoring may be further configured monitor one or more handovers of the device to another node. In an aspect, the apparatus 602/602' means for monitoring may be further configured monitor a number of measurement reports received from the device. In an aspect, the apparatus 602/602' means for monitoring may be further configured monitor parameters related to calls of the device at the femto node. In an aspect, the apparatus 602/602' means for monitoring may be further configured monitor handover of the device to the femto node relative to handover of the device from the femto node. In an aspect, the apparatus 602/602' means for monitoring may be further configured monitor applications or services of the femto node used by the device. In an aspect, the apparatus 602/602' means for monitoring may be further configured monitor handover information elements regarding the device received from a node from which the device is handed over to the femto node. In an aspect, the apparatus 602/602' means for monitoring may be further configured monitor one or more pathloss measurements over time.

In another aspect, the apparatus 602/602' further includes means for transmitting paging messages to the device. In another aspect, the means for transmitting may be further configured to transmit a measurement control message to the device requesting periodic measurement reports. In another aspect, the apparatus 602/602' means for assigning are further configured to assign the classification is based in part on the one or more handovers relative to one or more registration requests from the device. In another aspect, the apparatus 602/602' further includes means for modifying a location area code or routing area code of the femto node. In such an aspect, the means for monitoring may be configured to responses from the device based on the modifications. In another aspect, the apparatus 602/602' further includes means for performing one or more pathloss measurements from the femto node to the device. In another aspect, the apparatus 602/602' further includes means for ranking the device among a plurality of devices based on the one or more pathloss measurements and additional pathloss measurements of the plurality of devices. In such an aspect, the means for assigning may be further configured to assign the classification based in part on the ranking of the device among the plurality of devices. In another aspect, the apparatus 602/602' means for assigning may further be configured to the classification based in part on comparing the one or more parameters to one or more thresholds. In another aspect, the apparatus 602/602' means for assigning may further be configured to the classification based on comparing the one or more parameters to similar parameters monitored of other devices communicating with the femto node. In an aspect, the apparatus 602/602' means for providing may further be configured to determine a transmission power or time/frequency resource allocation for the device based on the classification. In an aspect, the apparatus 602/602' means for providing may further be configured to determine a set of services to provide to the device based on the classification. In an aspect, the apparatus 602/602' means for providing may further be configured to determine one or more advertisements to provide to the device based on the classification.

The aforementioned means may be one or more of the aforementioned modules of the apparatus 602 and/or the processing system 714 of the apparatus 602' configured to perform the functions recited by the aforementioned means. As described supra, the processing system 714 may include the TX data processor 314, the RX data processor 342, and the controller/processor 330. As such, in one configuration, the aforementioned means may be the TX data processor 314, the RX data processor 342, and the controller/processor 330 configured to perform the functions recited by the aforementioned means.

Figure 8:
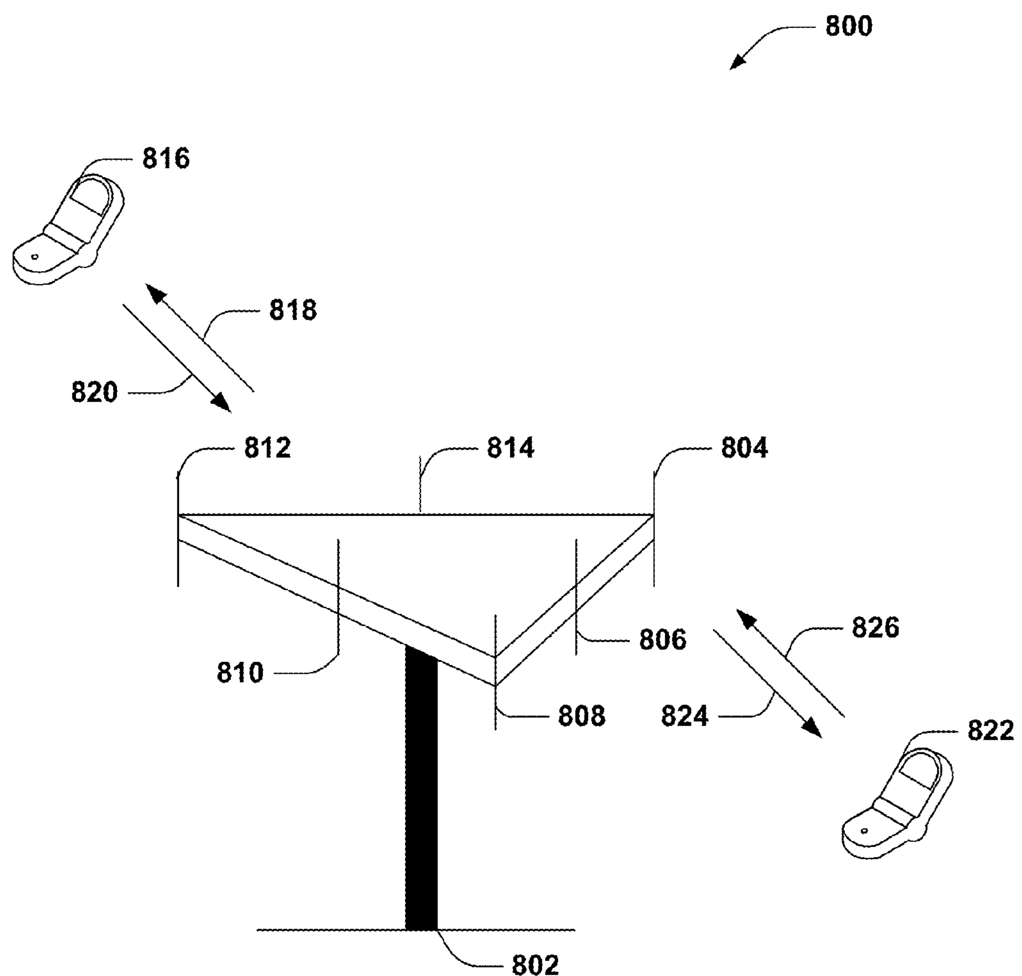
FIG. 8 is an illustration of an example wireless network environment that can be employed in conjunction with the various systems and methods described herein.

Referring now to FIG. 8, a wireless communication system 800 is illustrated in accordance with various embodiments presented herein. System 800 comprises a base station 802 that can include multiple antenna groups. For example, one antenna group can include antennas 804 and 806, another group can comprise antennas 808 and 810, and an additional group can include antennas 812 and 814. Two antennas are illustrated for each antenna group; however, more or fewer antennas can be utilized for each group. Base station 802 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 802 can communicate with one or more mobile devices such as mobile device 816 and mobile device 822; however, it is to be appreciated that base station 802 can communicate with substantially any number of mobile devices similar to mobile devices 816 and 822. Mobile devices 816 and 822 can be, for example, cellular phones, smart phones, laptops, handheld communication devices, handheld computing devices, satellite radios, global positioning systems, PDAs, and/or any other suitable device for communicating over wireless communication system 800. As depicted, mobile device 816 is in communication with antennas 812 and 814, where antennas 812 and 814 transmit information to mobile device 816 over a forward link 818 and receive information from mobile device 816 over a reverse link 820. Moreover, mobile device 822 is in communication with antennas 804 and 806, where antennas 804 and 806 transmit information to mobile device 822 over a forward link 824 and receive information from mobile device 822 over a reverse link 826. In a frequency division duplex (FDD) system, forward link 818 can utilize a different frequency band than that used by reverse link 820, and forward link 824 can employ a different frequency band than that employed by reverse link 826, for example. Further, in a time division duplex (TDD) system, forward link 818 and reverse link 820 can utilize a common frequency band and forward link 824 and reverse link 826 can utilize a common frequency band.

Each group of antennas and/or the area in which they are designated to communicate can be referred to as a sector of base station 802. For example, antenna groups can be designed to communicate to mobile devices in a sector of the areas covered by base station 802. In communication over forward links 818 and 824, the transmitting antennas of base station 802 can utilize beamforming to improve signal-to-noise ratio of forward links 818 and 824 for mobile devices 816 and 822. Also, while base station 802 utilizes beamforming to transmit to mobile devices 816 and 822 scattered randomly through an associated coverage, mobile devices in neighboring cells can be subject to less interference as compared to a base station transmitting through a single antenna to all its mobile devices. Moreover, mobile devices 816 and 822 can communicate directly with one another using a peer-to-peer or ad hoc technology as depicted. According to an example, system 800 can be a multiple-input multiple-output (MIMO) communication system.

Figure 9:
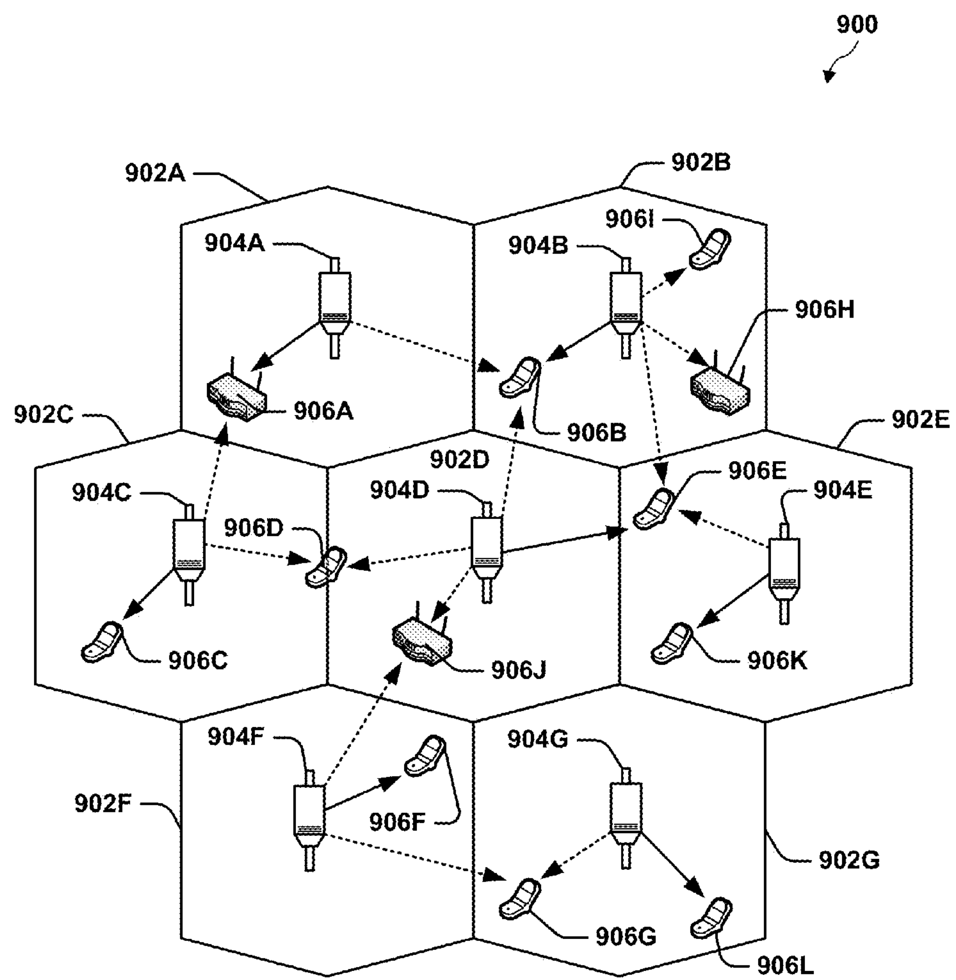
FIG. 9 illustrates an example wireless communication system, configured to support a number of devices, in which the aspects herein can be implemented.

FIG. 9 illustrates a wireless communication system 900, configured to support a number of users, in which the teachings herein may be implemented. The system 900 provides communication for multiple cells 902, such as, for example, macro cells 902A-902G, with each cell being serviced by a corresponding access node 904 (e.g., access nodes 904A-904G). As shown in FIG. 9, access terminals 906 (e.g., access terminals 906A-906L) can be dispersed at various locations throughout the system over time. Each access terminal 906 can communicate with one or more access nodes 904 on a forward link (FL) and/or a reverse link (RL) at a given moment, depending upon whether the access terminal 906 is active and whether it is in soft handoff, for example. The wireless communication system 900 can provide service over a large geographic region.

Figure 10:
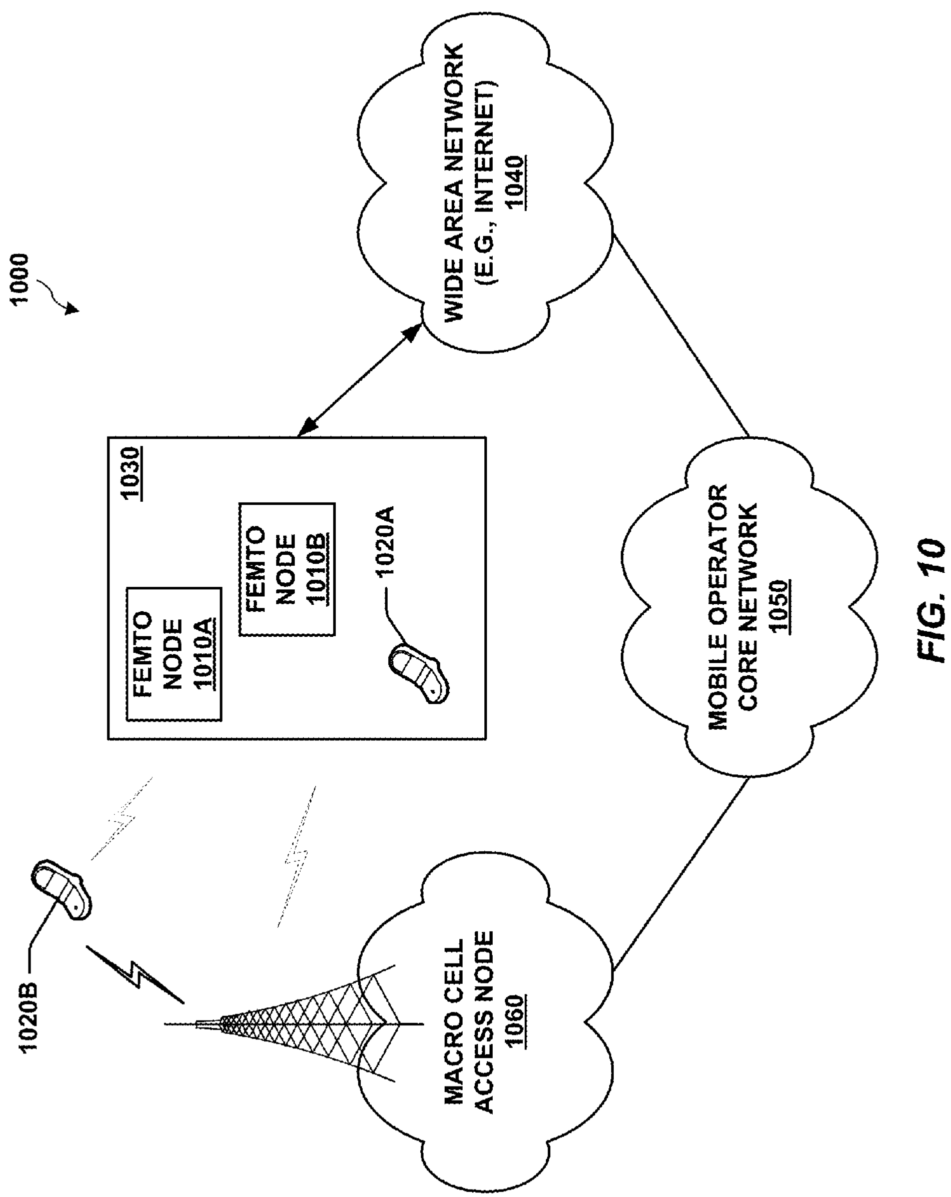
FIG. 10 is an illustration of an exemplary communication system to enable deployment of femtocells within a network environment.

FIG. 10 illustrates an exemplary communication system 1000 where one or more femto nodes are deployed within a network environment. Specifically, the system 1000 includes multiple femto nodes 1010A and 1010B (e.g., femtocell nodes or H(e)NB) installed in a relatively small scale network environment (e.g., in one or more user residences 1030). Each femto node 1010 can be coupled to a wide area network 1040 (e.g., the Internet) and a mobile operator core network 1050 via a digital subscriber line (DSL) router, a cable modem, a wireless link, or other connectivity means (not shown). As will be discussed below, each femto node 1010 can be configured to serve associated access terminals 1020 (e.g., access terminal 1020A) and, optionally, alien access terminals 1020 (e.g., access terminal 1020B). In other words, access to femto nodes 1010 can be restricted such that a given access terminal 1020 can be served by a set of designated (e.g., home) femto node(s) 1010 but may not be served by any non-designated femto nodes 1010 (e.g., a neighbor's femto node).

Figure 11:
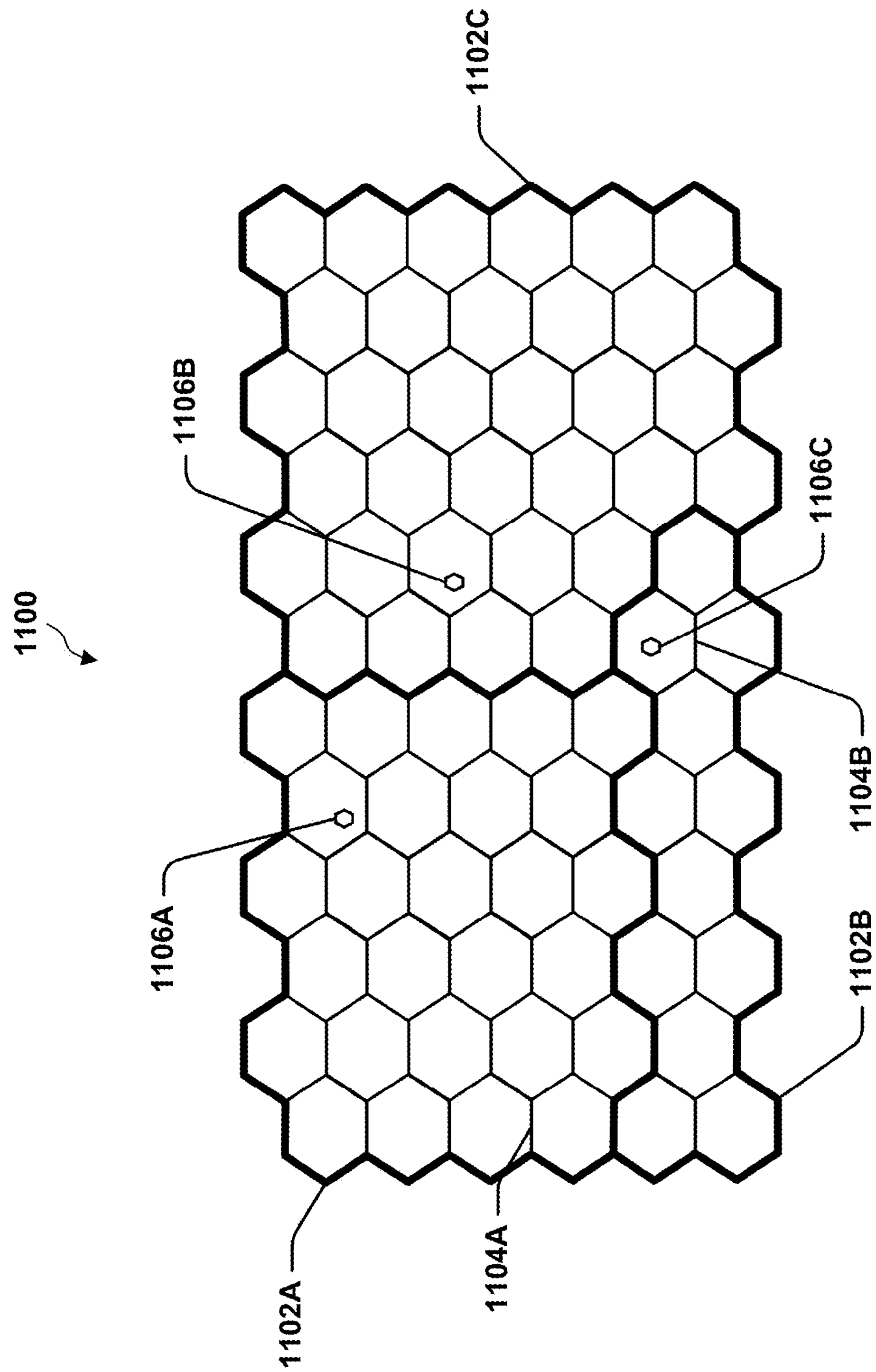
FIG. 11 illustrates an example of a coverage map having several defined tracking areas.

FIG. 11 illustrates an example of a coverage map 1100 where several tracking areas 1102 (or routing areas or location areas) are defined, each of which includes several macro coverage areas 1104. Here, areas of coverage associated with tracking areas 1102A, 1102B, and 1102C are delineated by the wide lines and the macro coverage areas 1104 are represented by the hexagons. The tracking areas 1102 also include femto coverage areas 1106. In this example, each of the femto coverage areas 1106 (e.g., femto coverage area 1106C) is depicted within a macro coverage area 1104 (e.g., macro coverage area 1104B). It should be appreciated, however, that a femto coverage area 1106 may not lie entirely within a macro coverage area 1104. In practice, a large number of femto coverage areas 1106 can be defined with a given tracking area 1102 or macro coverage area 1104. Also, one or more pico coverage areas (not shown) can be defined within a given tracking area 1102 or macro coverage area 1104.

Referring again to FIG. 10, the owner of a femto node 1010 can subscribe to mobile service, such as, for example, 3G mobile service, offered through the mobile operator core network 1050. In another example, the femto node 1010 can be operated by the mobile operator core network 1050 to expand coverage of the wireless network. In addition, an access terminal 1020 can be capable of operating both in macro environments and in smaller scale (e.g., residential) network environments. Thus, for example, depending on the current location of the access terminal 1020, the access terminal 1020 can be served by a macro cell access node 1060 or by any one of a set of femto nodes 1010 (e.g., the femto nodes 1010A and 1010B that reside within a corresponding user residence 1030). For example, when a subscriber is outside his home, he is served by a standard macro cell access node (e.g., node 1060) and when the subscriber is at home, he is served by a femto node (e.g., node 1010A). Here, it should be appreciated that a femto node 1010 can be backward compatible with existing access terminals 1020.

A femto node 1010 can be deployed on a single frequency or, in the alternative, on multiple frequencies. Depending on the particular configuration, the single frequency or one or more of the multiple frequencies can overlap with one or more frequencies used by a macro cell access node (e.g., node 1060). In some aspects, an access terminal 1020 can be configured to connect to a preferred femto node (e.g., the home femto node of the access terminal 1020) whenever such connectivity is possible. For example, whenever the access terminal 1020 is within the user's residence 1030, it can communicate with the home femto node 1010.

In some aspects, if the access terminal 1020 operates within the mobile operator core network 1050 but is not residing on its most preferred network (e.g., as defined in a preferred roaming list), the access terminal 1020 can continue to search for the most preferred network (e.g., femto node 1010) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the access terminal 1020 can limit the search for specific band and channel. For example, the search for the most preferred system can be repeated periodically. Upon discovery of a preferred femto node, such as femto node 1010, the access terminal 1020 selects the femto node 1010 for camping within its coverage area.

A femto node can be restricted in some aspects. For example, a given femto node can only provide certain services to certain access terminals. In deployments with so-called restricted (or closed) association, a given access terminal can only be served by the macro cell mobile network and a defined set of femto nodes (e.g., the femto nodes 1010 that reside within the corresponding user residence 1030). In some implementations, a femto node can be restricted to not provide, for at least one access terminal, at least one of: signaling, data access, registration, paging, or service.

In some aspects, a restricted femto node (which can also be referred to as a Closed Subscriber Group H(e)NB) is one that provides service to a restricted provisioned set of access terminals. This set can be temporarily or permanently extended as necessary. In some aspects, a Closed Subscriber Group (CSG) can be defined as the set of access nodes (e.g., femto nodes) that share a common access control list of access terminals. A channel on which all femto nodes (or all restricted femto nodes) in a region operate can be referred to as a femto channel.

Various relationships can thus exist between a given femto node and a given access terminal. For example, from the perspective of an access terminal, an open femto node can refer to a femto node with no restricted association. A restricted femto node can refer to a femto node that is restricted in some manner (e.g., restricted for association and/or registration). A home femto node can refer to a femto node on which the access terminal is authorized to access and operate on. A guest femto node can refer to a femto node on which an access terminal is temporarily authorized to access or operate on. An alien femto node can refer to a femto node on which the access terminal is not authorized to access or operate on, except for perhaps emergency situations (e.g., 911 calls).

From a restricted femto node perspective, a home access terminal can refer to an access terminal that is authorized to access the restricted femto node. A guest access terminal can refer to an access terminal with temporary access to the restricted femto node. An alien access terminal can refer to an access terminal that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given access terminal, and so on.

A wireless multiple-access communication system can simultaneously support communication for multiple wireless access terminals. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for classifying devices that communicate with a femto node for providing services thereto, comprising:

monitoring one or more parameters communicated by a device to the femto node;

determining a frequency of use of the femto node by the device based at least in part on the one or more parameters;

assigning a classification to the device based on the frequency of use; and providing the services to the device based on the classification, wherein the device is provided with a first level of service if the device is assigned a first classification, wherein the device is provided with a second level of service if the device is assigned a second classification, wherein the first level of service allows the device to utilize a first level of transmit power if it is determined that the frequency of use by the device is a first frequency of use, and wherein the second level of service allows the device to utilize a second level of transmit power, which is less than the first level of transmit power, if it is determined that the frequency of use by the device is a second frequency of use, which is less than the first frequency of use.

2. The method of claim 1, wherein the one or more parameters relate to idle-mode communications, active-mode communications, or handover of the device.

3. The method of claim 1, wherein the monitoring one or more parameters comprises monitoring location area update or routing area update messages from the device.

4. The method of claim 1, further comprising transmitting paging messages to the device, wherein the monitoring one or more parameters comprises monitoring responses to the paging messages.

5. The method of claim 1, wherein the monitoring one or more parameters comprises monitoring one or more handovers of the device to another node, and wherein the assigning the classification is based in part on the one or more handovers relative to one or more registration requests from the device.

6. The method of claim 1, further comprising modifying a location area code or routing area code of the femto node, wherein the monitoring one or more parameters comprises monitoring responses from the device based on the modifying.

7. The method of claim 1, further comprising transmitting a measurement control message to the device requesting periodic measurement reports, wherein the monitoring one or more parameters comprises monitoring a number of measurement reports received from the device.

8. The method of claim 1, wherein the monitoring one or more parameters comprises monitoring parameters related to calls of the device at the femto node.

9. The method of claim 8, wherein the one or more parameters comprise a frequency of call initiation or termination at the femto node, a duration of one or more calls at the femto node, or a frequency of inter-call initiation times at the femto node.

10. The method of claim 1, wherein the monitoring one or more parameters comprises monitoring handover of the device to the femto node relative to handover of the device from the femto node.

11. The method of claim 1, wherein the monitoring one or more parameters comprises monitoring applications or the services of the femto node used by the device.

12. The method of claim 1, wherein the monitoring one or more parameters comprises monitoring handover information elements regarding the device received from a node from which the device is handed over to the femto node.

13. The method of claim 1, further comprising performing one or more pathloss measurements from the femto node to the device, wherein the monitoring one or more parameters comprises monitoring the one or more pathloss measurements over time.

14. The method of claim 13, further comprising ranking the device among a plurality of devices based on the one or more pathloss measurements and additional pathloss measurements of the plurality of devices, wherein the assigning the classification is based in part on the ranking of the device among the plurality of devices.

15. The method of claim 1, wherein the assigning the classification is based in part on comparing the one or more parameters to one or more thresholds.

16. The method of claim 1, wherein the assigning the classification is based in part on comparing the one or more parameters to similar parameters monitored of other devices communicating with the femto node.

17. The method of claim 1, wherein the providing the services to the device comprises determining a transmission power or time/frequency resource allocation for the device based on the classification.

18. The method of claim 1, wherein the providing the services to the device comprises determining a set of services to provide to the device based on the classification.

19. The method of claim 1, wherein the providing the services to the device comprises determining one or more advertisements to provide to the device based on the classification.

20. An apparatus for classifying devices that communicate with a femto node for providing services thereto, comprising:

a processing system configured to:

monitor one or more parameters communicated by a device to the femto node;

determine a frequency of use of the femto node by the device based at least in part on the one or more parameters;

assign a classification to the device based on the frequency of use; and provide the services to the device based on the classification, wherein the device is provided with a first level of service if the device is assigned a first classification, wherein the device is provided with a second level of service if the device is assigned a second classification, wherein the first level of service allows the device to utilize a first level of transmit power if it is determined that the frequency of use by the device is a first frequency of use, and wherein the second level of service allows the device to utilize a second level of transmit power, which is less than the first level of transmit power, if it is determined that the frequency of use by the device is a second frequency of use, which is less than the first frequency of use; and a memory coupled to the processing system.

21. The apparatus of claim 20, wherein the processing system assigns the classification based in part on comparing the one or more parameters to a threshold or to similar parameters monitored of other devices communicating with the femto node.

22. The apparatus of claim 20, wherein the processing system provides the services to the device by determining a transmission power or time/frequency resource allocation for the device, a set of services to provide to the device, or one or more advertisements to present to the device, based on the classification.

23. An apparatus for classifying devices that communicate with a femto node for providing services thereto, comprising:

means for monitoring one or more parameters communicated by a device to the femto node;

means for determining a frequency of use of the femto node by the device based at least in part on the one or more parameters;

means for assigning a classification to the device based on the frequency of use; and means for providing the services to the device based on the classification, wherein the device is provided with a first level of service if the device is assigned a first classification, wherein the device is provided with a second level of service if the device is assigned a second classification, wherein the first level of service allows the device to utilize a first level of transmit power if it is determined that the frequency of use by the device is a first frequency of use, and wherein the second level of service allows the device to utilize a second level of transmit power, which is less than the first level of transmit power, if it is determined that the frequency of use by the device is a second frequency of use, which is less than the first frequency of use.

24. The apparatus of claim 23, wherein the means for assigning assigns the classification based in part on comparing the one or more parameters to a threshold or to similar parameters monitored of other devices communicating with the femto node.

25. The apparatus of claim 23, wherein the means for providing provides the services to the device by determining a transmission power or time/frequency resource allocation for the device, a set of services to provide to the device, or one or more advertisements to present to the device, based on the classification.

26. A non-transitory computer-readable medium storing computer executable code for classifying devices that communicate with a femto node for providing services thereto, comprising:

code for monitoring one or more parameters communicated by a device to the femto node;

code for determining a frequency of use of the femto node by the device based at least in part on the one or more parameters;

code for assigning a classification to the device based on the frequency of use; and code for providing the services to the device based on the classification, wherein the device is provided with a first level of service if the device is assigned a first classification, wherein the device is provided with a second level of service if the device is assigned a second classification, wherein the first level of service allows the device to utilize a first level of transmit power if it is determined that the frequency of use by the device is a first frequency of use, and wherein the second level of service allows the device to utilize a second level of transmit power, which is less than the first level of transmit power, if it is determined that the frequency of use by the device is a second frequency of use, which is less than the first frequency of use.

27. The non-transitory computer-readable medium of claim 26, further comprising code for assigning the classification based in part on comparing the one or more parameters to a threshold or to similar parameters monitored of other devices communicating with the femto node.

28. The non-transitory computer-readable medium of claim 26, further comprising code for providing the services to the device by determining a transmission power or time/frequency resource allocation for the device, a set of services to provide to the device, or one or more advertisements to present to the device, based on the classification.

29. A method for classifying devices that communicate with a femto node for providing services thereto, comprising:

receiving one or more parameters communicated by a device to the femto node;

determining a frequency of use of the femto node by the device based at least in part on the one or more parameters;

assigning a classification to the device based on the frequency of use; and providing the classification to one or more femto nodes, including the femto node, for providing the services to the device, wherein the device is provided with a first level of service if the device is assigned a first classification, wherein the device is provided with a second level of service if the device is assigned a second classification, wherein the first level of service allows the device to utilize a first level of transmit power if it is determined that the frequency of use by the device is a first frequency of use, and wherein the second level of service allows the device to utilize a second level of transmit power, which is less than the first level of transmit power, if it is determined that the frequency of use by the device is a second frequency of use, which is less than the first frequency of use.

30. The method of claim 29, wherein the one or more parameters relate to idle-mode communications, active-mode communications, or handover of the device.

31. The method of claim 29, wherein the assigning includes assigning the classification based in part on comparing the one or more parameters to a threshold or to similar parameters monitored of other devices communicating with the one or more femto nodes.

32. An apparatus for classifying devices that communicate with a femto node for providing services thereto, comprising:

a processing system configured to:

receive one or more parameters communicated by a device to the femto node;

determine a frequency of use of the femto node by the device based at least in part on the one or more parameters;

assign a classification to the device based on the frequency of use; and provide the classification to one or more femto nodes, including the femto node, for providing the services to the device, wherein the device is provided with a first level of service if the device is assigned a first classification, wherein the device is provided with a second level of service if the device is assigned a second classification, wherein the first level of service allows the device to utilize a first level of transmit power if it is determined that the frequency of use by the device is a first frequency of use, and wherein the second level of service allows the device to utilize a second level of transmit power, which is less than the first level of transmit power, if it is determined that the frequency of use by the device is a second frequency of use, which is less than the first frequency of use; and a memory coupled to the processing system.

33. The apparatus of claim 32, wherein the one or more parameters relate to idle-mode communications, active-mode communications, or handover of the device.

34. The apparatus of claim 32, wherein the processing system assigns the classification based in part on comparing the one or more parameters to a threshold or to similar parameters monitored of other devices communicating with the femto node.

35. An apparatus for classifying devices that communicate with a femto node for providing services thereto, comprising:

means for receiving one or more parameters communicated by a device to the femto node;

means for determining a frequency of use of the femto node by the device based at least in part on the one or more parameters;

means for assigning a classification to the device based on the frequency of use; and means for providing the classification to one or more femto nodes, including the femto node, for providing the services to the device, wherein the device is provided with a first level of service if the device is assigned a first classification, wherein the device is provided with a second level of service if the device is assigned a second classification, wherein the first level of service allows the device to utilize a first level of transmit power if it is determined that the frequency of use by the device is a first frequency of use, and wherein the second level of service allows the device to utilize a second level of transmit power, which is less than the first level of transmit power, if it is determined that the frequency of use by the device is a second frequency of use, which is less than the first frequency of use.

36. The apparatus of claim 35, wherein the one or more parameters relate to idle-mode communications, active-mode communications, or handover of the device.

37. The apparatus of claim 35, wherein the means for assigning is further configured to assign the classification based in part on comparing the one or more parameters to a threshold or to similar parameters monitored of other devices communicating with the femto node.

38. A non-transitory computer-readable medium storing computer executable code for classifying devices that communicate with a femto node for providing services thereto, comprising:

code for receiving one or more parameters communicated by a device to the femto node;

code for determining a frequency of use of the femto node by the device based at least in part on the one or more parameters;

code for assigning a classification to the device based on the frequency of use; and code for providing the classification to one or more femto nodes, including the femto node, for providing the services to the device, wherein the device is provided with a first level of service if the device is assigned a first classification, wherein the device is provided with a second level of service if the device is assigned a second classification, wherein the first level of service allows the device to utilize a first level of transmit power if it is determined that the frequency of use by the device is a first frequency of use, and wherein the second level of service allows the device to utilize a second level of transmit power, which is less than the first level of transmit power, if it is determined that the frequency of use by the device is a second frequency of use, which is less than the first frequency of use.

39. The non-transitory computer-readable medium of claim 38, wherein the one or more parameters relate to idle-mode communications, active-mode communications, or handover of the device.

40. The non-transitory computer-readable medium of claim 38, further comprising code for assigning the classification based in part on comparing the one or more parameters to a threshold or to similar parameters monitored of other devices communicating with the femto node.

41. The method of claim 1, wherein the first level of service allows the device to utilize a first amount of resources, and the second level of service allows the device to utilize a second amount of resources, which is less than the first amount of resources.

42. The method of claim 29, wherein the first level of service allows the device to utilize a first amount of resources, and the second level of service allows the device to utilize a second amount of resources, which is less than the first amount of resources.

* * * * *